United States Patent [19]

Fancher

[11] Patent Number: 5,779,098
[45] Date of Patent: Jul. 14, 1998

[54] PRESSURE CONTROL SYSTEM FOR FREE-FLOATING PISTON

[75] Inventor: Hershel Edward Fancher, New Albany, Ind.

[73] Assignee: Grand Soft Equipment Company, Louisville, Ky.

[21] Appl. No.: 701,631

[22] Filed: Aug. 22, 1996

[51] Int. Cl.[6] ..................................... B67D 5/22
[52] U.S. Cl. ........................ 222/41; 222/334; 222/389
[58] Field of Search ........................ 222/152, 399, 222/389, 135, 105, 95, 23, 183, 327, 249; 334, 146.6, 444, 41; 92/134

[56] References Cited

U.S. PATENT DOCUMENTS

| | | | |
|---|---|---|---|
| 3,327,906 | 6/1967 | Gömann | 222/389 |
| 4,886,189 | 12/1989 | Vanderjagt | 222/49 |
| 5,048,724 | 9/1991 | Thomas | 222/95 |
| 5,114,054 | 5/1992 | Watson | 222/389 |
| 5,150,820 | 9/1992 | Mcgill | 222/389 |
| 5,259,842 | 11/1993 | Plechinger et al. | 222/389 |
| 5,265,764 | 11/1993 | Rowe et al. | 222/95 |
| 5,405,054 | 4/1995 | Thomas | 222/95 |
| 5,452,824 | 9/1995 | Danek et al. | 222/389 |
| 5,492,249 | 2/1996 | Beach | 222/96 |

*Primary Examiner*—Philippe Derakshani
*Attorney, Agent, or Firm*—Dorr, Carson, Sloan & Birney, P.C.

[57] ABSTRACT

An apparatus and method are disclosed to force a frozen food product out of a receptacle by moving a piston back and forth within the receptacle. Pressurized air is used to move the piston toward the frozen product, thereby forcing the frozen product out of the receptacle. To move the piston away from the frozen product, the pressurized air is sent through a venturi that also connects to the receptacle. The flow of pressurized air through the venturi creates a vacuum in the receptacle. The vacuum pulls the piston away from the frozen product.

42 Claims, 6 Drawing Sheets

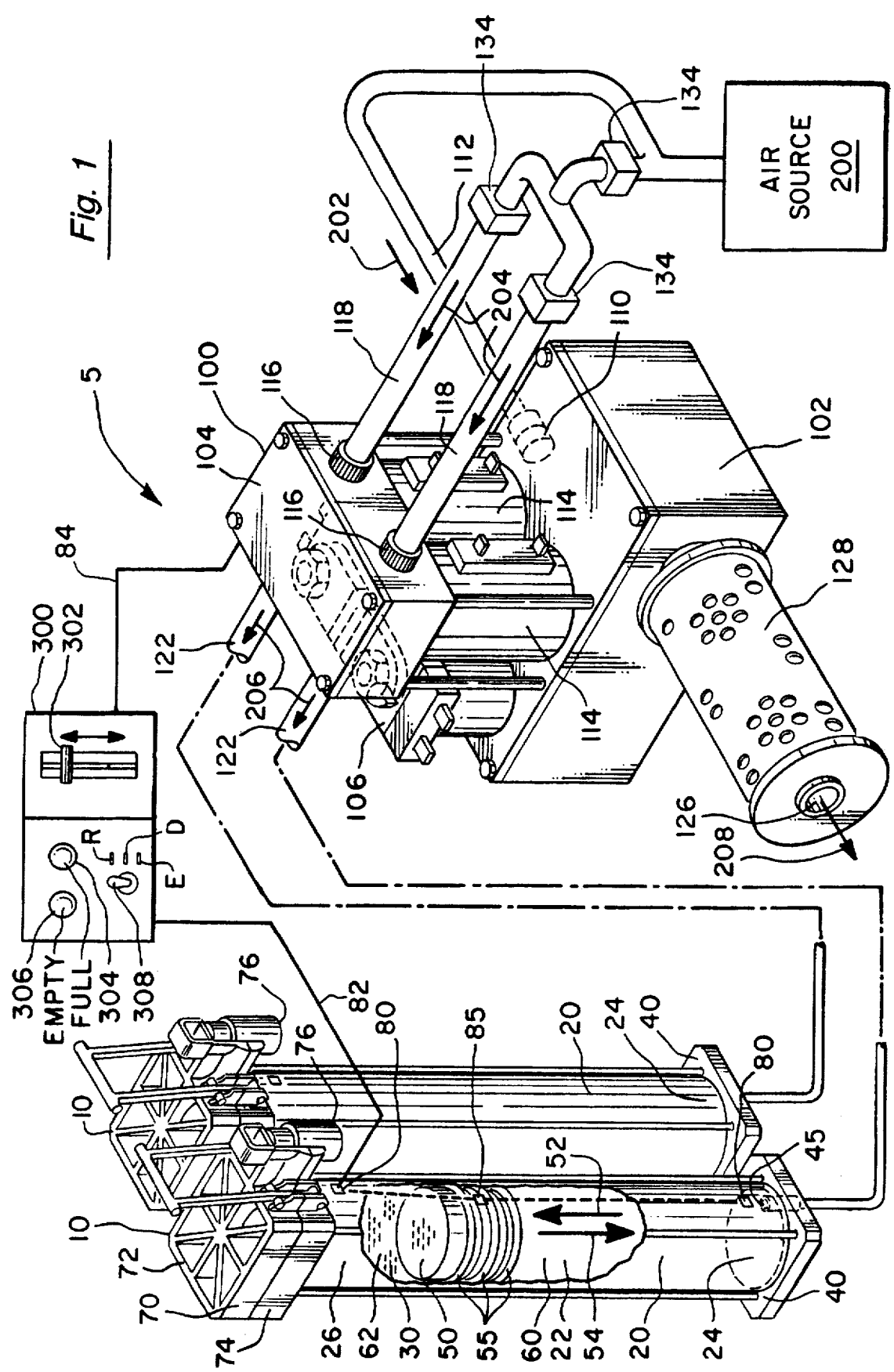

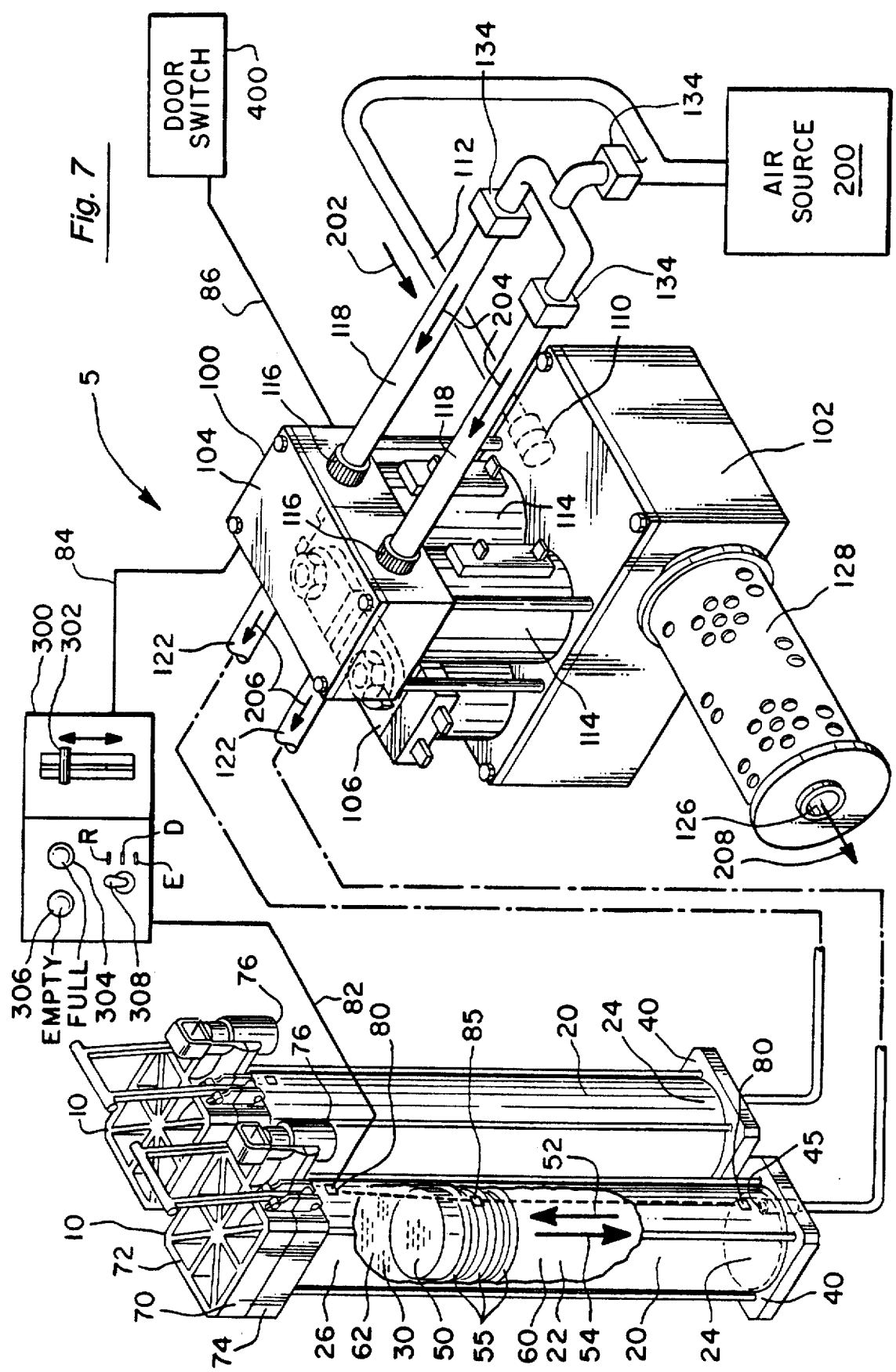

5,779,098

1

PRESSURE CONTROL SYSTEM FOR FREE-FLOATING PISTON

BACKGROUND OF THE INVENTION

1. Field of the Invention

The present invention relates, in general, to pneumatically driven dispensers, and, more particularly, to using pressurized air to control the dispensing of a frozen product.

2. Statement of the Problem

Frozen confections such as ice cream, yogurt, and sorbets are well-liked food items whose popularity has increased in recent years. As their popularity increases, so too does the necessity for dispensing these frozen confections to consumers in measured amounts quickly and easily. It is also desirable to provide a choice of flavors in one location, and to minimize the time needed to clean and refill the dispensers.

A variety of apparatuses have been developed for dispensing frozen confections quickly, easily, and in measured amounts. In general, to dispense a frozen confection, the confection is placed either directly in a receptacle or within a collapsible container that is then put in the receptacle. The confection is then forced out of the receptacle by, for example, a piston within the receptacle that is caused to move against the confection or against the collapsible container. The piston thus forces the confection out of an outlet in the receptacle.

Once the confection has been dispensed, it is necessary to retract the piston to clean the receptacle and/or insert additional confection for dispensing. Pistons are driven by several conventional systems, for example, hydraulics, mechanical engines, or pneumatic systems. Pistons driven by hydraulic or mechanical systems are generally attached to the motive force by a driving shaft that extends from the back of the piston. The piston is both extended and retracted by the driving shaft.

Pistons driven by pneumatics are often free floating within their jackets or cylinders. Such free-floating pistons are extended by using pressurized air to push against the back of the piston.

A search of the prior art in which pressurized air is used to move a piston to dispense frozen food out of a receptacle discovered the following patents:

| Rowe | 5,265,764 | Nov. 30, 1993 |
| Beach | 5,492,249 | Feb. 20, 1996 |
| Gömann | 3,327,906 | June 27, 1967 |
| Vanderjagt | 4,886,189 | Dec. 12, 1989 |
| Thomas | 5,048,724 | Sep. 17, 1991 |
| Thomas | 5,405,054 | Apr. 11, 1995 |

U.S. Pat. No. 5,265,764 issued to Rowe sets forth a dual-action free-floating piston within a cylinder. Air pressure is used to drive the piston to dispense bagged frozen product. After the product is dispensed, the air pressure is directed to the opposite side of the piston to drive the piston in the opposite direction.

U.S. Pat. No. 5,492,249 to Beach sets forth an apparatus that uses high-pressure air to move a free-floating piston toward the material to be dispensed. A safety device is provided so the apparatus cannot be opened until the air pressure is vented. The operator manually retracts the piston by pushing on it. This patent is assigned to the owner of the present invention.

U.S. Pat. No. 3,327,906 issued to Gömann discloses a piston in a cylinder. The piston is moved by a compressed fluid to dispense a paste contained in the cylinder. A suction generator is used to provide for better sealing of the piston to the cylinder and to remove any compressed fluid that escapes around the sides of the piston.

U.S. Pat. No. 4,886,189 to Vanderjagt teaches an approach for dispensing liquids in which a movable chamber slides down a stationary piston toward the liquid, which is kept in a separate chamber. Either air pressure or vacuum is used to move the chamber.

U.S. Pat. Nos. 5,048,724 and 5,405,054 to Thomas disclose a confection dispenser in which a collapsible container holding the confection is compressed in order to extrude the confection from the dispenser. Preferably, a bellows is used that is caused to expand by admitting pressurized air into the interior of the bellows. The expanding bellows pushes against the collapsible container. To replace the collapsible container, the air pressure inside the expanded bellows is released either automatically or manually.

The pistons can be retracted in several ways. In one way, as shown in the Rowe patent, the pressurized air is routed to the front of the piston to push it back. This system necessitates providing several apertures and more than one sealed pressure chamber. In another method of retraction, as for the Beach system, the piston is retracted manually by pushing against the piston by hand or with a rod after the pressurized air is released. This method can lead to damage of the system, and may be difficult for an operator to perform owing to the stiffness of the piston. Thus, a need exists to automate the release of pressurized air and to retract the piston using the same source of pressurized air without additional apertures or sealed pressure chambers.

None of the dispensing systems described above provides a method for pneumatically retracting a piston by supplying a pneumatic air source to the same side of the piston as is used when extending the piston, using the same aperture and the same sealed pressure chamber. Neither do any of the dispensing systems described above provide a system having three automatic modes of operation: a dispensing mode, a retraction mode, and a resting or exhaust mode.

3. Solution to the Problem

The present invention provides a dispensing control system for frozen food products or other viscous materials in which pressurized air moves a free-floating piston in the dispenser toward the product, forcing the product out of the dispenser, and in which the same pressurized air is used to create a vacuum that retracts the piston. Both the pressurized air and the vacuum are delivered to the system through the same aperture. When the piston is not being moved, the system automatically exhausts the pressurized air. The system is quickly and easily cleaned, and there is no likelihood that the system will be damaged by the retraction or removal of the piston. The dispensing control system is compact, so that it can be used on a countertop. Several dispensers can be run from the same source of pressurized air.

It is an object of the present invention to provide a system for pneumatically dispensing a frozen product with a free-floating piston in which the system uses a common source of pressurized air for both extending and retracting the piston.

It is a further object of the present invention to provide a pneumatic dispensing control system for frozen products in which a vacuum is used to retract a free-floating piston after the product is dispensed.

It is an object of the present invention to use a common pressurized air source to extend the piston and to provide the vacuum that retracts the piston.

It is another object of the present invention to provide an automatic exhaust system to release the pressure on the piston when the frozen product is not being dispensed.

It is yet another object of the present invention to provide a pneumatic dispensing control system that has only one pressure chamber.

It is another object of the present invention to provide a pneumatic dispensing control system for frozen products in which several dispensers can be run simultaneously from the same source of pressurized air.

SUMMARY OF THE INVENTION

The present invention discloses a system for pneumatically dispensing a frozen (between 0 degrees and 5 degrees Fahrenheit) confection or other food product, using relatively low-pressure air (between 15 and 100 psi). The invention comprises a receptacle for holding the product. The receptacle contains a free-floating piston that slides back and forth within the receptacle.

The present invention also comprises three modes of operation: a dispensing mode, a retraction mode, and an exhaust mode. The present invention comprises means for delivering pressurized air into the receptacle when it is in the dispensing mode, and means for generating a vacuum in the receptacle through the same lines as the pressurized air when it is in the retraction mode. The pressurized air causes the piston to move toward the frozen product, forcing the product out of said receptacle. The vacuum pulls the piston away from the frozen product.

A chamber is formed in the receptacle by the end of the piston, the receptacle surface, and an enclosed end of the receptacle. An aperture is cut into the chamber and is connected by a line to the means for delivering pressurized air and to the means for generating a vacuum in the chamber. A series of valves is placed between the source of pressurized air and the receptacle. The valves include a three-way valve and a two-way valve. A venturi is placed between the pressurized air and an exhaust port. The three-way valve is in fluid communication with the source of pressurized air, the receptacle, and the venturi. The two-way valve is in fluid communication with the source of pressurized air and the venturi.

Depending on the settings of the valves, either pressurized air or vacuum is delivered to the chamber in the receptacle, or the pressure in the chamber is exhausted to the atmosphere. To deliver pressurized air to the chamber, the three-way valve is opened between the source of pressurized air and the chamber and closed to the venturi. The two-way valve is closed between the source of pressurized air and the venturi. Thus, pressurized air travels to the chamber, where it pushes the piston toward the frozen product, which is contained in the receptacle on the opposite side of the piston from the chamber.

The product can be placed either directly in the receptacle or in a collapsible container that is then placed in the receptacle. The collapsible container can be, for example, a flexible bag or a tube with accordion walls. Other types of collapsible containers will be readily evident to those skilled in the art. The collapsible container has the advantages of increasing the cleanliness of the dispensing system and making replacement of the product easier.

When neither pressurized air or vacuum is delivered to the chamber, the dispensing control system is in the exhaust mode. This would occur, for example, when a desired portion of product has been dispensed. When the system is in the exhaust mode, the piston is stationary, and the air pressure in the chamber is that of the ambient atmosphere. To achieve this state, the three-way valve is closed between the source of pressurized air and the chamber and opened between the chamber and the venturi. The two-way valve is closed between the source of pressurized air and the venturi. The pressurized air remaining in the chamber after the dispensing of the product then exits the chamber via the three-way valve to the venturi, where it leaves the system through the exhaust port.

When the piston is to be retracted, a vacuum is introduced into the chamber in the following manner. The three-way valve is closed between the source of pressurized air and the chamber, and opened between the chamber and the venturi. The two-way valve is opened between the source of pressurized air and the venturi. Thus, pressurized air flows through the venturi and out the exhaust port. The pressurized air flowing through the venturi increases in velocity as it passes through the venturi. This increase in velocity causes a corresponding decrease in the air pressure, creating a vacuum in the chamber, which is in fluid communication with the venturi via the three-way valve. This vacuum then retracts the piston away from the frozen product. When the piston has been retracted the desired amount, the valves are positioned in the exhaust mode as described above, and air at atmospheric pressure enters the system, displacing the vacuum.

The present invention has the advantage of not requiring an arm attached to the piston or a push rod to retract the piston, avoiding possible damage to the system and increasing cleanliness. It has the further advantage that a single aperture delivers both the pressurized air and the vacuum to the receptacle, so that only one sealed chamber is necessary, and neither the pressurized air or the vacuum comes into contact with the food product being dispensed. Further, the piston is advanced and retracted using the same source of pressurized air. An additional vacuum source is not necessary.

Yet another advantage of the present invention is that several valve and dispenser systems can be run from the same source of pressurized air. The system is compact enough to fit on a countertop, and uses only small amounts of electricity to run the valves.

These and other advantages of the pneumatic dispensing control system of the present invention are described in more detail in the figures and in the detailed description below.

DETAILED DESCRIPTION OF THE DRAWING

1. Overview

Figure 1:
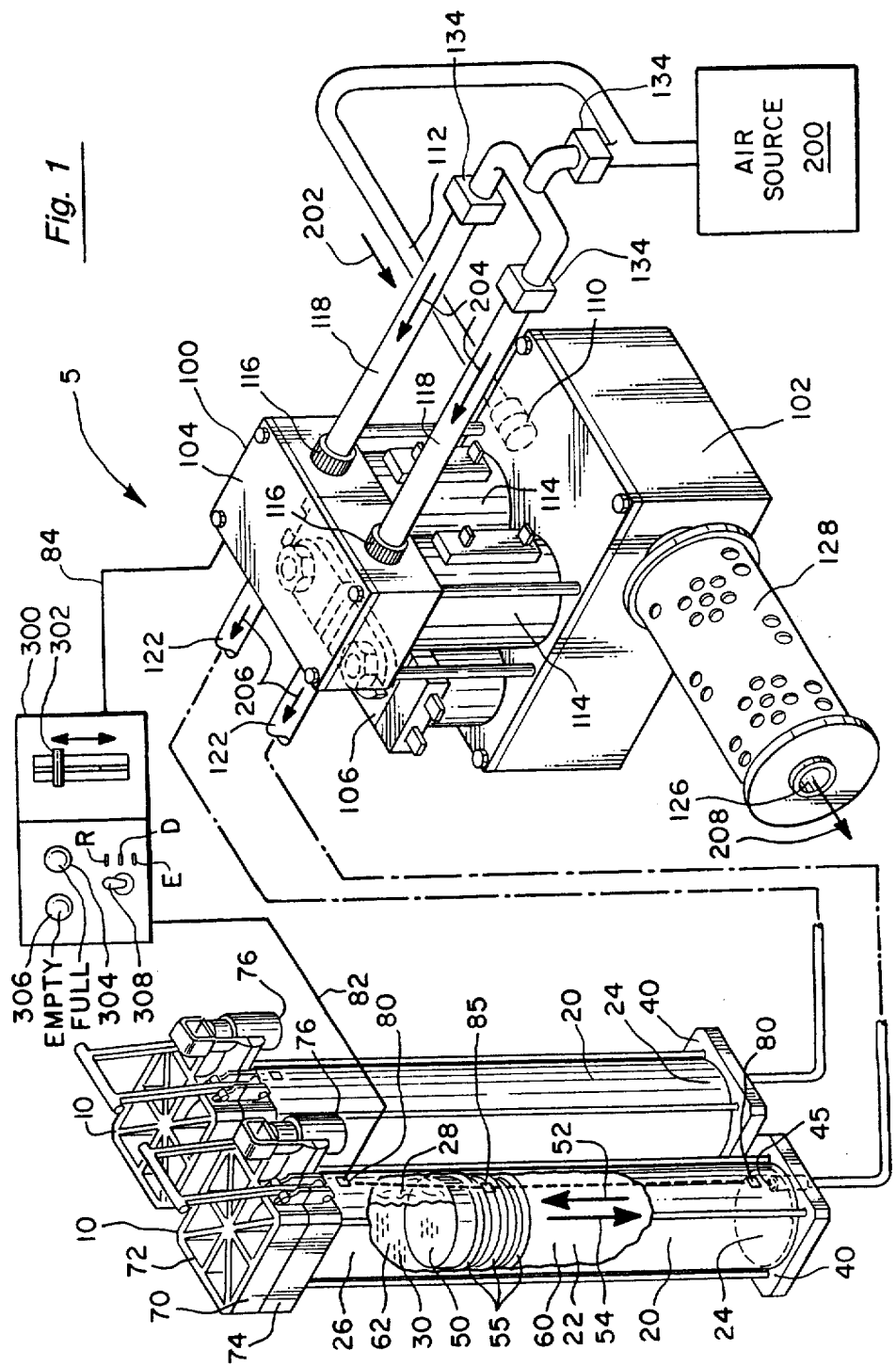
FIG. 1 is a perspective view of the manifold and dispenser of the present invention.
Figure 6:
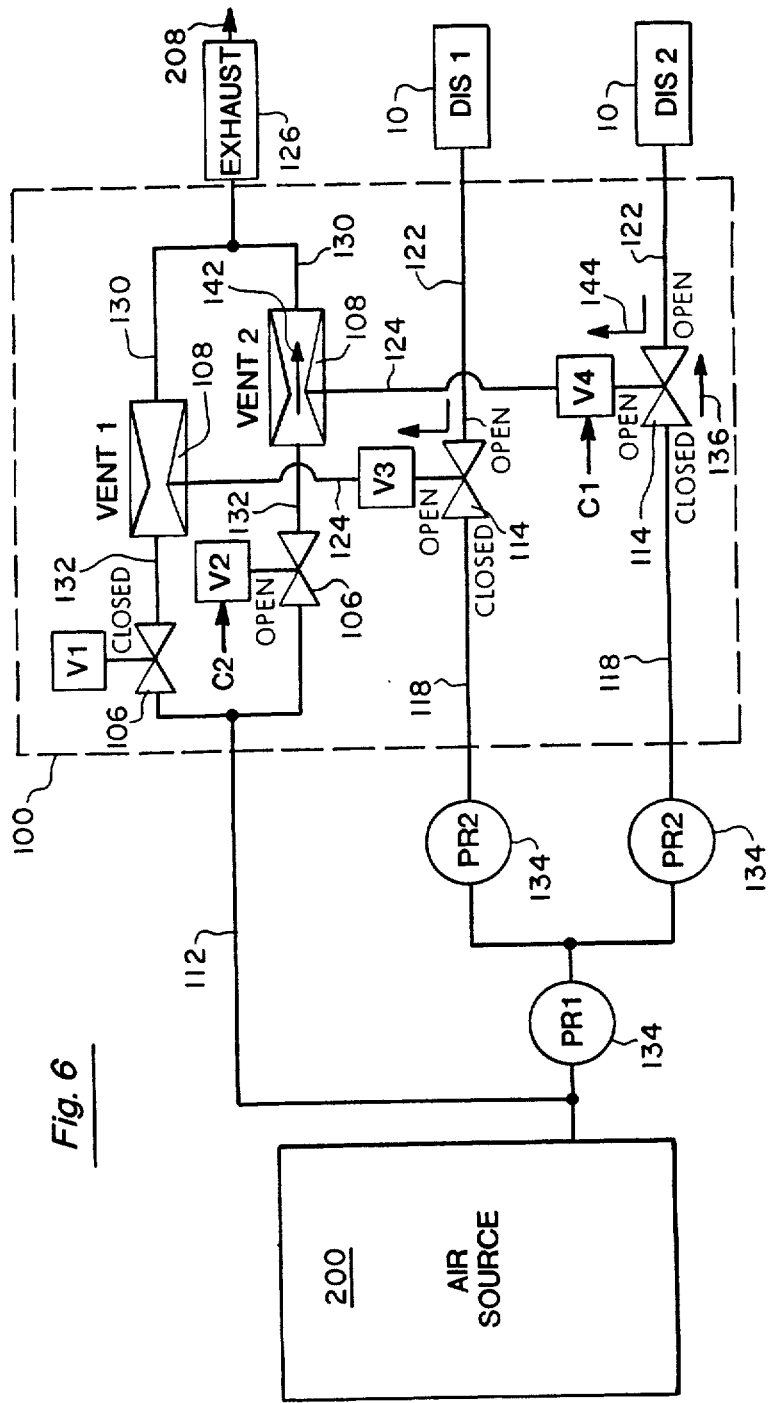

FIG. 1 illustrates the pneumatic dispensing control system 5 of the present invention. The dispensing control system 5 dispenses a frozen food product 30 by using a movable piston 50 to force the food product 30 in direction 52 and eventually out of a spigot 76. When needed, for example, when all the food product 30 has been dispensed, the piston 50 is retracted by use of a vacuum in direction 54 so that the dispensing control system 5 can be reloaded with food product 30 and/or cleaned.

The preferred embodiment of the pneumatic dispensing control system 5 includes one or a plurality of dispensing assemblies 10, only two of which are shown in FIG. 1. Each dispensing assembly 10 includes a receptacle 20 having a passageway 22 for receiving the frozen food product 30 and the piston 50 therein. The food product 30 may be placed directly within the receptacle 20 or, preferably, the food product 30 is bagged in a collapsible container (28) that is placed within the receptacle 20. The collapsible container 28 can be, for example, a flexible bag or a tube with accordion walls. Other types of collapsible containers 28 will be readily evident to those skilled in the art. The present invention is particularly directed toward the dispensing of frozen dairy confections, for example, ice cream or yogurt; however, it should be understood that the pneumatic dispensing control system 5 of the present invention can be used for any system in which it is necessary to move a piston 50 back and forth within a receptacle and that the present invention is not to be limited to the specific description herein.

The receptacles 20 are elongated sleeves generally made of fiberglass or the like, having openings in each end 24, 26 thereof. The first opening in the first end 24 receives the piston 50 therein, and the second opening in the second end 26 receives the food product 30 therein.

The piston 50 fits securely within the receptacle 20. One or a plurality of slideable seals 55 both enable the piston 50 to move in the receptacle 20 and provide a fluid-tight sliding seal between the piston 50 and the receptacle 20. In the preferred embodiment illustrated in FIG. 1, three seals 55 encircle the piston 50. However, it should be understood that any number of seals 55 can be used in the present invention as long as at least one of the seals 55 provides a fluid-tight sliding seal between the piston 50 and the receptacle 20. For example, in an alternative embodiment (not shown), two U-cup seals and one wiper ring are used.

A sensor 80 or a plurality of sensors 80 are attached to the receptacle 20 to determine the approximate position of the piston 50 as the piston 50 moves inside the receptacle 20. Any type of sensor 80 can be utilized that can detect the piston 50. For example, sensor 80 types that can be used include, but are not limited to, capacitative, inductive, Hall, and Reed type sensors. A metallic or magnetic material 85 may be attached to the piston 50 depending on the type of sensor 80 used. By detecting the position of the piston 50 within the receptacle 20, the sensor 80 can be used to correlate the position of the piston 50 with the amount of food product 30 remaining within the receptacle 20.

A support plate 40 covers the first end 24 of the receptacle 20. The support plate 40 includes an aperture 45 through which pressurized air can enter the receptacle 20. The receptacle 20, support plate 40, and piston 50 define a closed chamber 60.

The second end 26 of the receptacle 20 is covered by a pressure lid assembly 70. The pressure lid assembly 70 includes a pressure lid 72, a pressure lid mount plate 74, and a spigot 76. The receptacle 20, pressure lid assembly 70, and piston 50 define a second chamber 62 that contains the food product 30 or the collapsible container 28 holding the food product 30.

In the usual situation, the receptacle 20 is placed within a casing (not shown) having a door. The spigot 76 protrudes through the door for the dispensing of the product 30. A control panel 300, which is shown in FIG. 1, is located on the door of the casing. One control panel 300 is used for each dispenser 10.

The control panel 300 comprises a manual activating handle 302 that is physically connected to the spigot 76. The manual handle 302 is also connected by an electrical signaling system to the manifold 100, as discussed in more detail below. The control panel 300 also comprises two signal lights, 304 and 306. These signal lights 304, 306 are connected to the sensor 80 via line 82. When the receptacle 20 is full of frozen product 30, signal light 304 is lit. When the receptacle 20 is empty and the frozen product 30 has been dispensed, signal light 306 becomes activated.

Generally, in one embodiment of the present invention, the manual handle 302 is in an actuating relationship with the piston 50 through the pneumatic control system 5 via line 84, as is discussed in more detail below, so that upon the manual handle 302 being actuated by a operator to a preselected position, the piston 50 is actuated and moves toward the second end 26 of the receptacle 20 as shown by arrow 52, forcing the frozen product 30 out of the receptacle 20 through the spigot 76. Upon the release of the handle 302, the piston 50 is disengaged, the system 5 enters the exhaust mode, releasing the pressurized air, and the movement of the piston 50 toward the frozen product 30 is stopped. In a preferred embodiment, discussed in more detail below, the piston 50 is operable in response to a pressurized air source 200 that both moves the piston 50 toward the second end 26 as shown by arrow 52 in FIG. 1 for dispensing the food product 30 and retracts the piston 50 toward the first end 24 as shown by arrow 54 when it is desired to replace the food product 30 and/or clean the receptacle 20.

2. Details of the Pneumatic Dispensing Control System 5

The pneumatic dispensing control system 5 comprises one or a plurality of dispensing assemblies 10 as described above connected to a manifold assembly 100. In the preferred embodiment of the present invention, two dispensing assemblies 10 are connected to one manifold assembly 100 as shown in FIG. 1. In a second embodiment (not shown), a series of manifold assemblies 100, each having two dispensing assemblies 10 connected thereto, are set up wherein all the manifold assemblies 100 are connected to a single source of pressurized air 200. In a third embodiment (not shown), a single dispensing assembly 10 is connected to each manifold assembly 100. Other combinations will be evident to those skilled in the art.

Figure 2:
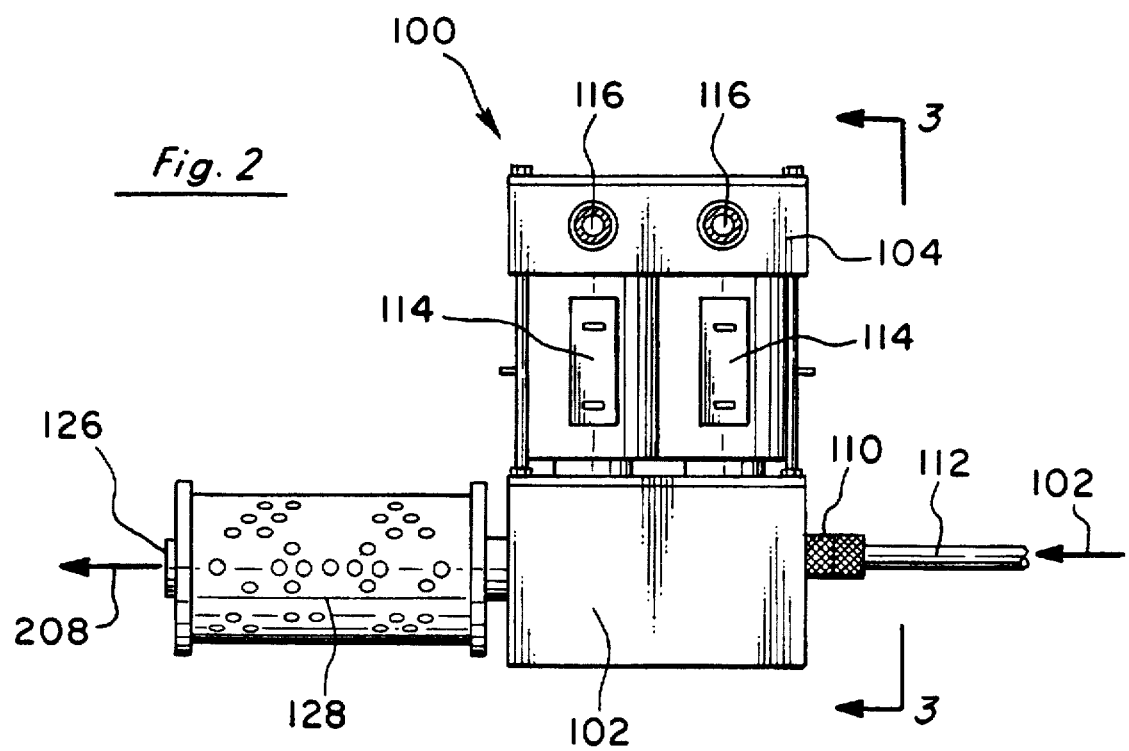
FIG. 2 is an end elevational view of the manifold of FIG. 1.
Figure 4:
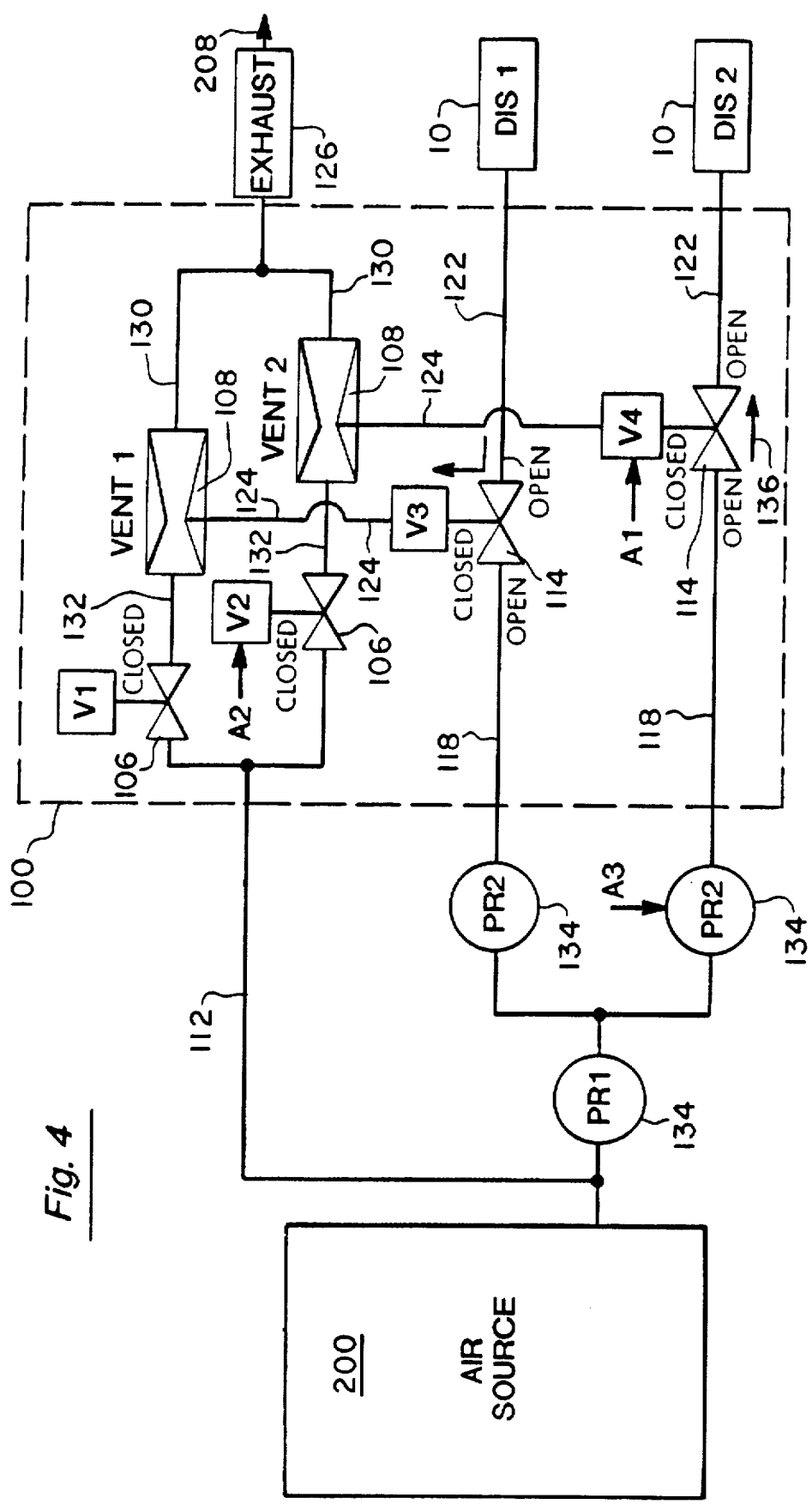
FIG. 4 is a schematic view of the pneumatic dispensing control system of the present invention illustrating the system in the dispensing mode.
Figure 5:
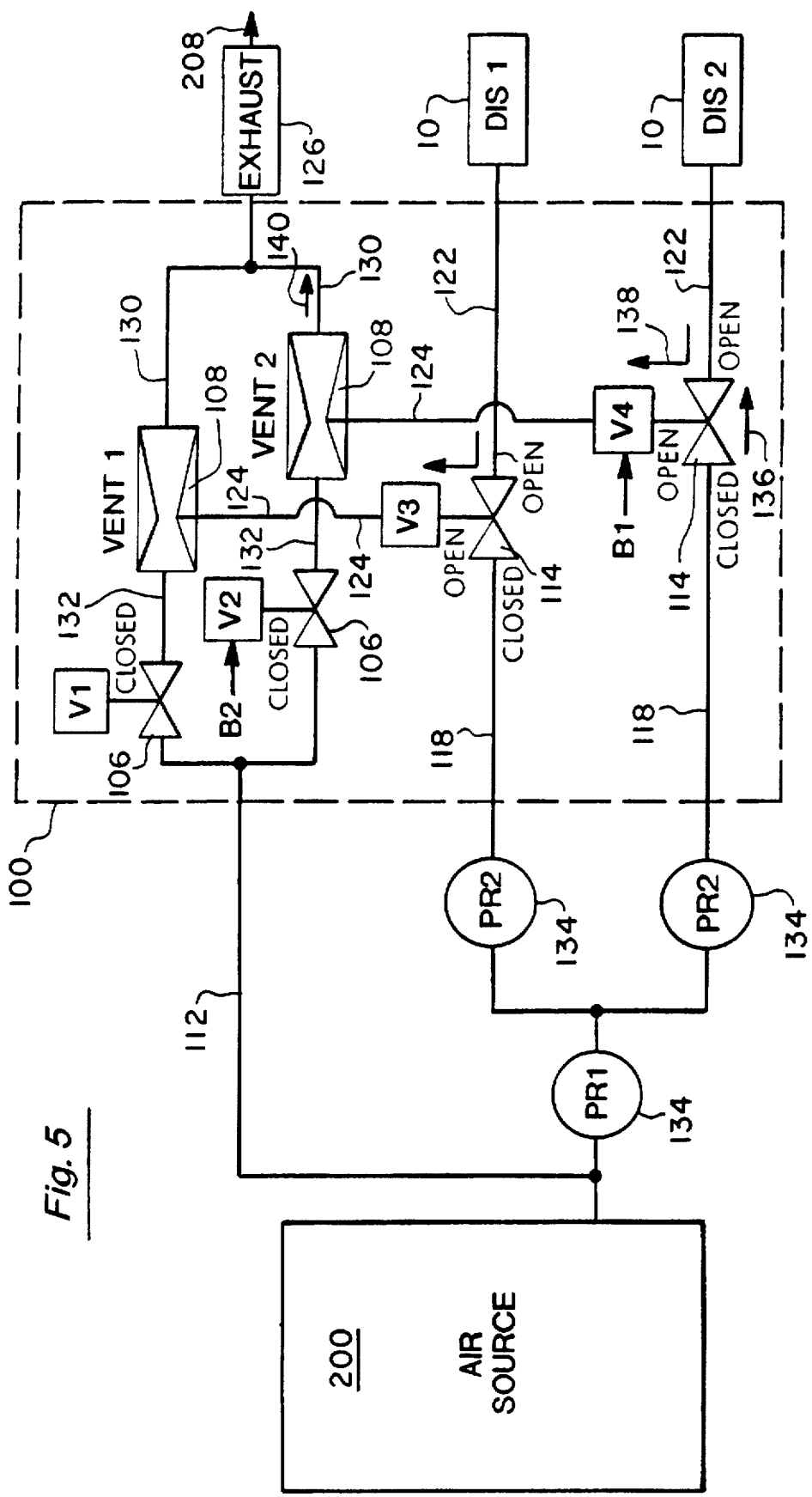
FIG. 5 is a schematic view of the pneumatic dispensing control system of the present invention illustrating the system in the exhaust mode.
Figure 6:
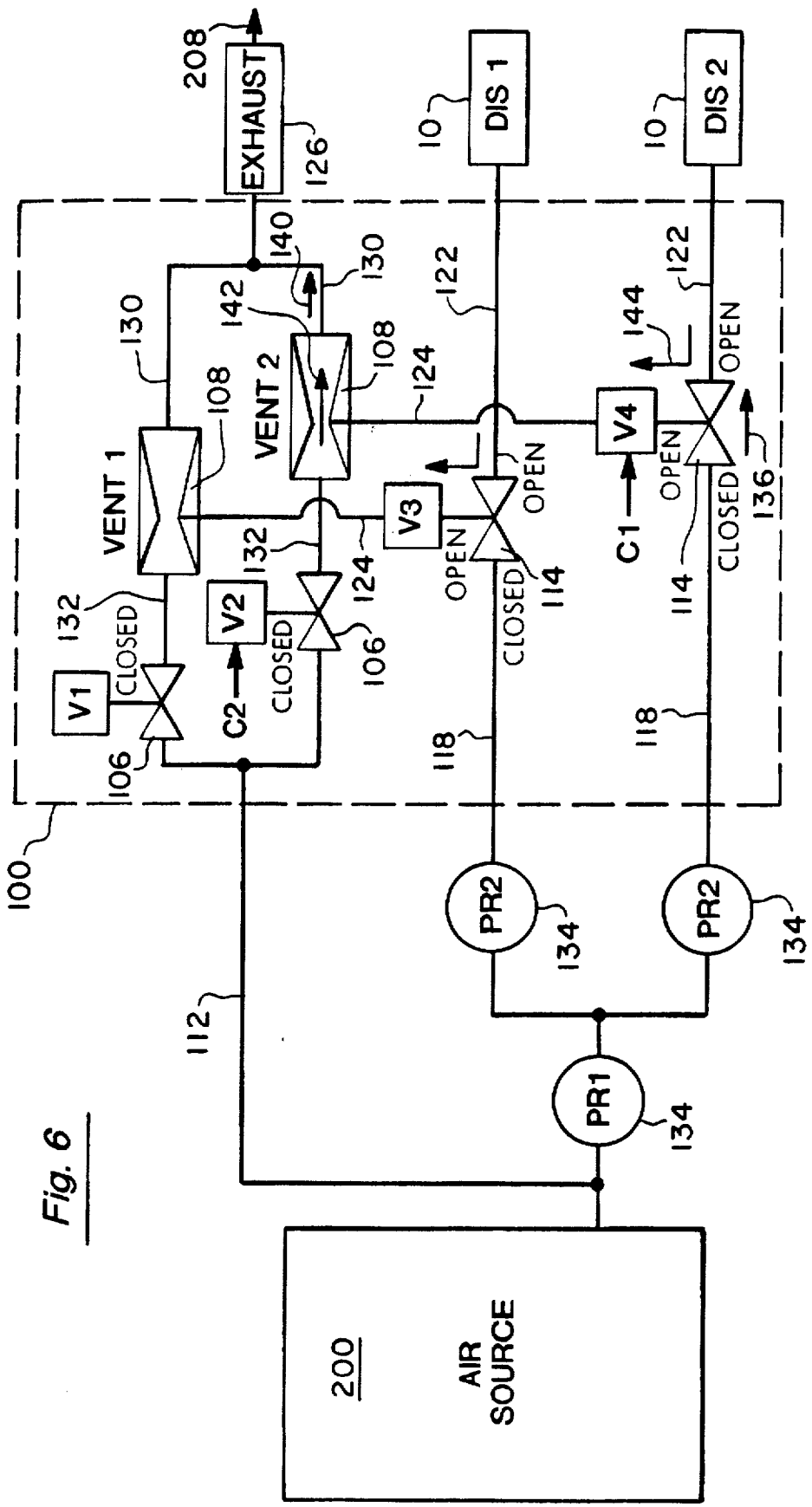
FIG. 6 is a schematic view of the pneumatic dispensing control system of the present invention illustrating the system in the retraction mode.

The manifold assembly 100 comprises a base manifold 102 and a switching manifold 104. The base manifold 102 houses one or a plurality of two-way valves 106 and a plurality of venturis 108 (the venturis 108 are shown in FIGS. 4 to 6). One two-way valve 106 and one venturi 108 are used for each dispensing assembly 10 that is connected to the manifold assembly 100. The base manifold 102 also includes an inlet port 110, as seen in FIG. 2, to which is attached by line 112 a source of pressurized air 200 (see FIG. 1) that flows through line 112 in the direction indicated by arrow 202. The pressurized air source 200 is in fluid communication via line 112 with the plurality of two-way valves 106 and venturis 108 contained within the base manifold 102. The pressurized air source 200, via the two-way valves 106 and venturis 108, is also in fluid communication with an exhaust port 126 delivering exhausted air 208, which is described in greater detail below.

Figure 3:
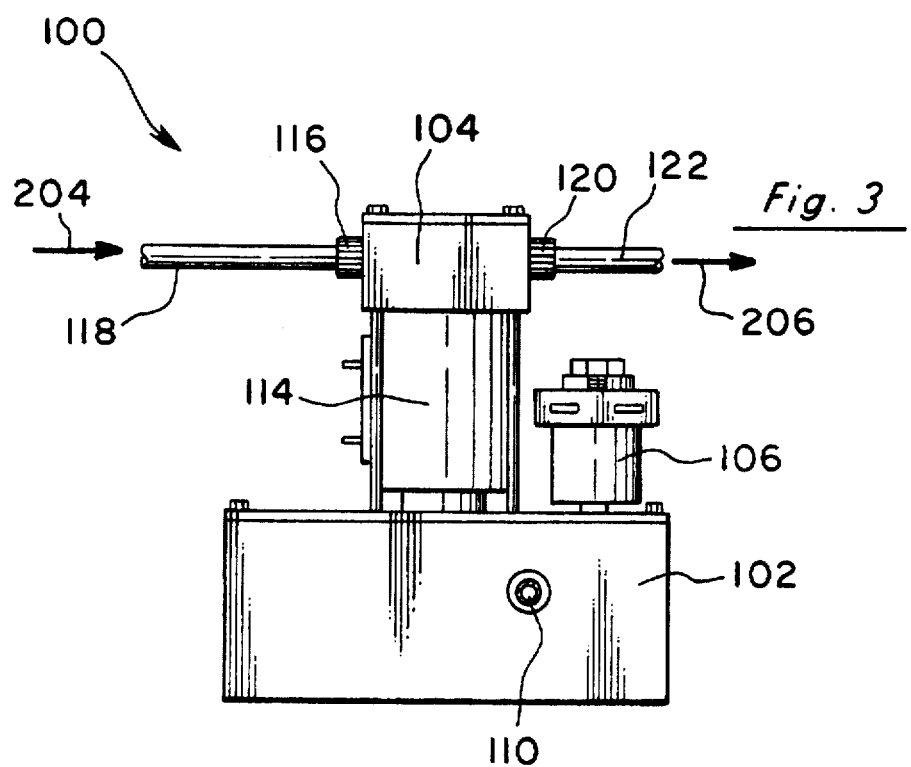
FIG. 3 is a side elevational view of the manifold of FIG. 1.

The switching manifold 104 of the manifold assembly 100 houses one or a plurality of three-way valves 114, one three-way valve 114 for each dispensing assembly 10. Each three-way valve 114 includes an inlet port 116, illustrated in FIG. 1, to which the pressurized air source 200 is connected by a line 118 through which the pressurized air 200 flows in the direction indicated by arrow 204. Each three-way valve 114 also includes an outlet port 120 to which a dispensing assembly 10 is connected by a line 122 through which pressurized air flows in the direction indicated by arrow 206 (this can also be seen in FIG. 3). Each three-way valve 114 is also connected to a venturi 108 by a line 124 (see FIGS. 4 to 6). Thus, via its three-way valve 114, each dispensing assembly 10 is in fluid communication with the pressurized air source 200 and also with its respective venturi 108.

The valves 106, 114 in the preferred embodiment are solenoid valves; however, the present invention is not meant to be limited to the use of solenoid valves, and other types of valves known to those skilled in the art are included in the present invention.

The base manifold 102 also comprises an exhaust port 126 to which a muffler 128 is attached, as illustrated in FIGS. 1 and 2. The exhaust port 126 is connected to each venturi 108 by lines 130, as shown in FIGS. 4 to 6. Thus, each dispensing assembly 10, via its venturi 108, is in fluid communication with the exhaust port 126. Air is exhausted from the exhaust port 126 as shown by arrow 208.

The connections among the dispensing assembly 10, the manifold assembly 100, and the pressurized air source 200 are illustrated in more detail in FIGS. 4 to 6 and are discussed in more detail below.

3. Regulation of the Pressurized Air Flow

FIGS. 4, 5, and 6 provide schematic illustrations of the connections that are made between the dispensing assembly 10, the manifold assembly 100, and the pressurized air source 200 in the various operating modes of a preferred embodiment of the pneumatic dispensing control system 5 of the present invention. In the preferred embodiment, the pneumatic dispensing control system 5 has three operating modes: the dispensing mode shown in FIG. 4, the exhaust mode shown in FIG. 5, and the retraction mode shown in FIG. 6. FIGS. 4 to 6 illustrate a preferred embodiment with two dispensing assemblies 10 connected to one manifold assembly 100. In the discussion below, it should be understood that each dispensing assembly 10 has its own two-way valve 106, three-way valve 114, and venturi 108, but shares a common pressurized air source 200 with another dispensing assembly 10. For example, dispensing assembly 10 DIS2 is connected to three-way valve 114 V4, two-way valve 106 V2, and venturi 108 VENT2.

The pressurized air source 200 in the preferred embodiment illustrated in FIGS. 4 to 6 comprises a 2.5-gallon storage tank containing air pressurized to a pressure of at least 100 psi. It is to be understood that other types of pressurized air sources are included under the teachings of the present invention. For example, an air compressor can be used to maintain the pressurized air. Other methods of providing pressurized air (or other suitable fluid) will be evident to those skilled in the art, and the present invention is not meant to be limited by the particular description herein.

Pressurized air at 100 psi flows directly via line 112 to each two-way valve 106 and from each two-way valve 106 via a line 132 to the respective venturi 108. For the three-way valves 114, however, in the preferred embodiment the air pressure is regulated by a plurality of step-down pressure regulators 134 before the air reaches the three-way valves 114. As shown in FIG. 4, each dispensing assembly 10 is connected to the pressurized air source 200. Between the pressurized air source 200 and the three-way valve 114 connected to the dispensing assembly 10 is located at least one step-down pressure regulator 134 to reduce the air pressure from 100 psi to a range of about 15 to about 60 psi. In the preferred embodiment illustrated in FIGS. 1 and 4, two step-down regulators 134, PR1 and PR2, are located on line 118 for each dispensing assembly 10. The first step-down regulator, PR1, reduces the air pressure from about 100 psi to about 60 psi. The second step-down regulator, PR2, further reduces the air pressure to between about 15 psi and about 60 psi. The second step-down regulator PR2 provides a variable amount of air pressure to the first chamber 60 in response to the amount of pull on the manual handle 302, as discussed in more detail below.

a) Dispensing Mode

In the dispensing mode shown in FIG. 4, when the manual handle 302 of one of the dispensing assemblies 10 is actuated by an operator, a signal is sent via line 84 (shown in FIG. 1) to the valves 106, 114 connected to that dispensing assembly 10. For example, when the manual handle 302 of the dispensing assembly 10 labeled DIS2 in FIG. 4 is actuated, signals $A_1$, $A_2$ are sent that simultaneously (1) open (signal $A_1$) the three-way valve 114 labeled V4 in FIG. 4 between the pressurized air source 200 and the dispensing assembly 10 DIS2, (2) close (signal $A_1$) the three-way valve 114 V4 between the dispensing assembly 10 DIS2 and the venturi 108 labeled VENT2 in FIG. 4, and (3) close (signal $A_2$) the two-way valve 106 labeled V2 in FIG. 4 between the pressurized air source 200 and the venturi 108 VENT2. Pressurized air is thereby allowed to flow through the line 118 to the three-way valve 114 V4 and then through line 122 from the three-way valve 114 V4 into the dispensing assembly 10 DIS2 as shown by the arrow 136. This flow 136 of pressurized air causes the piston 50 to move toward the second end 26 of the receptacle 20, forcing the frozen product 30 out of the spigot 76 of the pressure lid assembly 70, as shown in FIG. 1. In FIG. 4, the dispensing assembly 10 labeled DIS1 is also illustrated in the dispensing mode.

When the operator of the dispenser wishes to dispense more than one serving of frozen product 30, the operator pulls harder on the manual activating handle 302. This harder pull activates a signal $A_3$ that goes to the step-down pressure regulator 134 PR2. Signal $A_3$ signals the pressure regulator PR2 to provide more pressure to the dispensing assembly 10 in order to move the piston 50 farther, so that larger servings of frozen product 30 are dispensed. Up to about 60 psi pressure is delivered to the dispensing assembly 10.

b) Exhaust Mode

When the manual handle 302 of the dispensing assembly 10 is not actuated, as illustrated in FIG. 5, the three-way valve 114 closes between the pressurized air source 200 and the dispensing assembly 10 and opens between the dispensing assembly 10 and the venturi 108, allowing the pressurized air in the dispensing assembly 10 to exhaust through the venturi 108 and from there out the exhaust port 126. The two-way valve 106 between the pressurized air source 200 and the venturi 108 remains closed during this time. Thus, the pressure inside the dispensing assembly 10 is reduced to atmospheric pressure and the piston 50 stops moving. In addition, the exhaustion of the pressurized air within the dispensing assembly 10 acts as a safety measure to prevent injuries should the dispensing assembly 10 inadvertently be opened after the frozen product 30 has been dispensed.

For example, after the desired amount of frozen product 30 has been dispensed from dispensing assembly 10 DIS2 as described above and in FIG. 4, the manual handle 302 is released by the operator. Signals $B_1$, $B_2$ are sent by this release that simultaneously (1) close (signal $B_1$) the three-way valve 114 V4 between the pressurized air source 200 and the dispensing assembly 10, (2) open (signal $B_1$) the three-way valve V4 between the dispensing assembly and the venturi 108 VENT2, and (3) close (signal $B_2$) the two-way valve 106 V2 between the pressurized air source 200 and the venturi 108 VENT2, as illustrated in FIG. 5. The pressurized air within the dispensing assembly 10 is thereby allowed to flow from the dispensing assembly 10 through line 122 to the three-way valve 114 V4, as shown by the arrow 138, and then through line 124 to the venturi 108 VENT2, and finally through line 130 and out the exhaust port 126, as shown by arrows 140 and 208. In this manner the air pressure inside the dispensing assembly 10 is quickly reduced from about 15–60 psi to ambient atmospheric pressure.

c) Retraction Mode

There are times when it is necessary to move the piston 50 away from the second end 26 and toward the first end 24 of the receptacle 20, that is, away from the dispensing end. For example, when all the frozen product 30 has been dispensed, the piston 50 will be located close to the second end 26 of the receptacle 20, and must be moved in order to insert more of the frozen product 30. Or, after the frozen product 30 has been dispensed, it may be necessary to clean the dispensing assembly 10.

FIG. 6 illustrates the positions of the valves 106, 114 that enable the piston 50 to be rapidly retracted from the second end 26 toward the first end 24. The operator initiates the retraction of the piston 50 by moving the switch 308 on the control panel 300 (shown in FIG. 1) to the top position, indicated by R in FIG. 1. The switch 308 sends signals $C_1$ and $C_2$ to the valves 114 and 106, respectively. For example, to retract the piston 50 in the dispensing assembly 10 labeled DIS2 in FIG. 6, the three-way valve 114 V4 is opened by signal $C_1$ between the dispensing assembly 10 DIS2 and the venturi 108 VENT2 and is closed by signal $C_1$ between the pressurized air source 200 and the dispensing assembly 10 DIS2, as was the situation in the exhaust mode described above and in FIG. 5. In the retraction mode, however, the two-way valve 106 V2 is opened by signal $C_2$ between the pressurized air source 200 and the venturi 108 VENT2, allowing the pressurized air to flow through the venturi 108 VENT2 as shown by arrow 142 and out the exhaust port 126 as shown by arrow 208. The pressurized air flowing 142 through the venturi 108 VENT2 increases in velocity as it passes through the venturi 108 VENT2. This increase in velocity causes a corresponding decrease in the air pressure, which creates a vacuum (shown by arrow 144) in lines 124 and 122 and then in the sealed chamber 60. This vacuum retracts the piston 50 from the second end 26 of the receptacle 20 toward the first end 24, as shown in FIG. 1.

When the piston 50 has been retracted the desired amount, as determined either visually or with the sensor 80, the switch 308 is released by the operator and the valves 106, 114 are positioned so that the system 5 is in the exhaust mode, as described above and illustrated in FIG. 5. This allows ambient atmosphere to enter the dispensing assembly 10, and the piston 50 therefore stops moving.

In FIG. 6, the dispensing assembly 10 labeled DIS1 is shown in the exhaust mode.

d) Operation of the Pneumatic Dispensing Control System 5

The operation of the various modes of the pneumatic dispensing control system 5 as described above and in FIGS. 4–6 for dispenser DIS2 is set forth in the following Table I.

TABLE I

| Mode | Manual handle 302 | Switch 308 | Signals | Signal sent to: |
|---|---|---|---|---|
| Dispensing | Pulled | Dispensing mode D | $A_1$ | Valve V4 |
| | | | $A_2$ | Valve V2 |
| | Pulled harder | | $A_3$ | Regulator PR2 |
| Exhaust | Released | Exhaust mode E | $B_1$ | Valve V4 |
| | | | $B_2$ | Valve V2 |
| Retraction | Released | Retraction mode R | $C_1$ | Valve V4 |
| | | | $C_2$ | Valve V2 |

It is to be expressly understood that the signals (i.e., A, B, and C) can be of any suitable electrical value required to open and close the valves of the present invention. For example, signal A could be high (i.e., +5 volts direct current) to open valve V4 and low (i.e., 0 volts direct current) to close valve V4.

4. Alternative Embodiment

Figure 7:
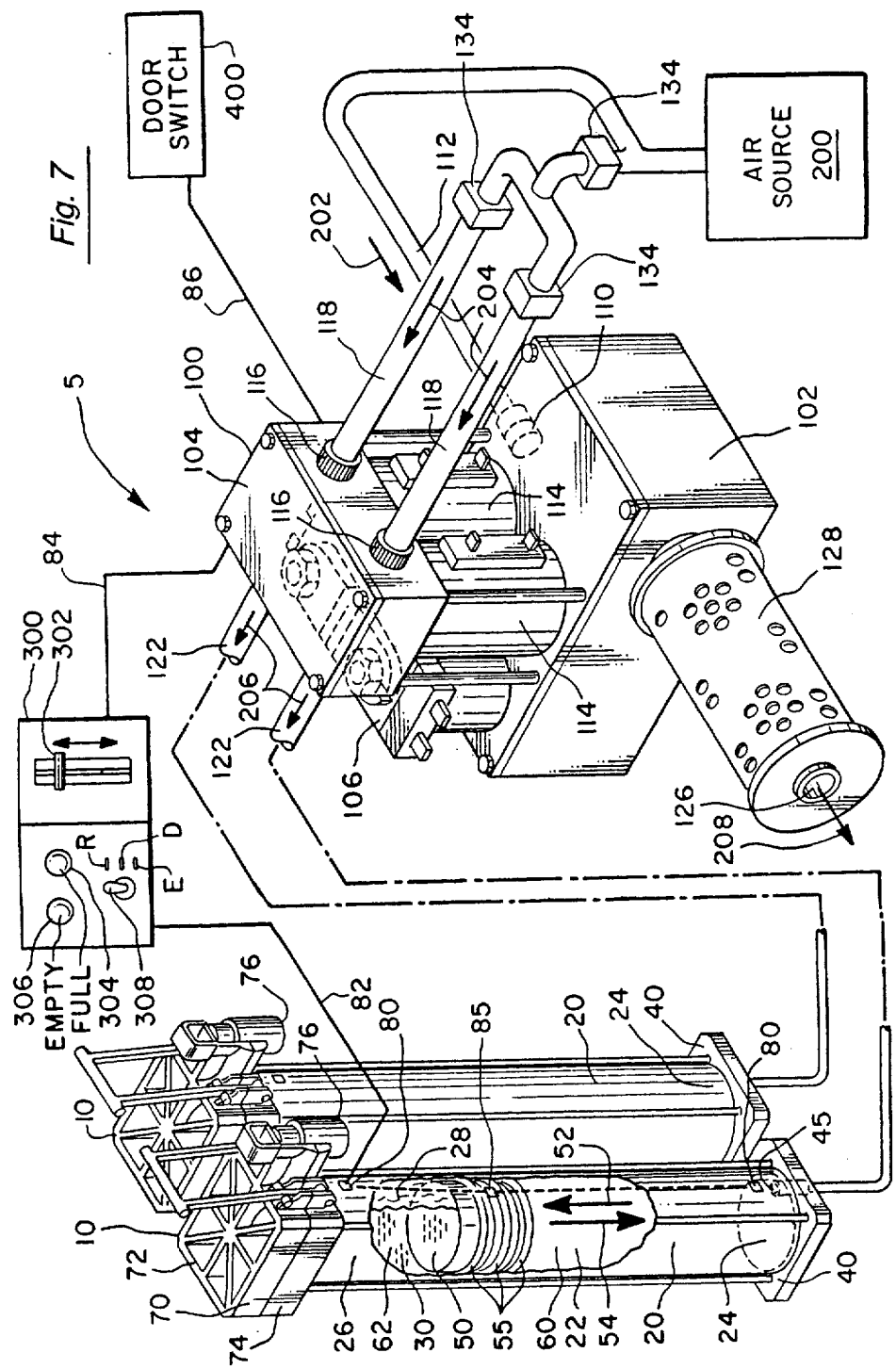
FIG. 7 is a perspective view of the present invention illustrating a door switch.

In an alternative preferred embodiment illustrated in FIG. 7, a door switch 400 is located on the door (not shown) of the casing enclosing the dispensing assemblies 10. The door switch 400 is activated by the opening and closing of the door. Signals from the door switch 400 are sent to the three-way valve 114 via line 86.

In this alternative embodiment, the control panel 300 comprises a spring-loaded toggle switch 308 that, when pressed by an operator, activates the three modes of the pneumatic control system 5 in conjunction with the door switch 400. The modes are indicated by the lines R (retraction), D (dispense), and E (exhaust) on the control panel 300, as shown in FIG. 7.

In the discussion of the modes set forth below, in each case the description is limited to only one dispensing assembly 10, dispensing assembly DIS2 as illustrated in FIGS. 4, 5, and 6.

a) Dispensing Mode

The toggle switch 308 is generally set in the middle position, as indicated by line D on the control panel 300 shown in FIG. 7, which configures the dispensing mode of the pneumatic control system 5 when the door is closed and the door switch 400 is off. In the dispensing configuration of this alternative embodiment, the toggle switch 308 sends a signal $A_1$ via line 84 to the three-way valve 114 V4 and a signal $A_2$ to the two-way valve 106 V2, setting the valves 106, 114 in the configuration illustrated in FIG. 4. Pressurized air is thus able to flow from the air source 200 to the dispensing assembly 10 DIS2. The pressure of this flowing air is regulated by the step-down regulators 136 PR1, PR2 to be about 15 psi.

When the manual handle 302 is then pulled by an operator, this increases the air pressure released by the step-down regulator 134 PR2 from about 15 psi to about 50 psi. The increased air pressure causes the piston 50 to move in the direction of arrow 52 in FIG. 7, forcing the frozen food product 30 out of the spigot 76. When the desired amount of product 30 has been dispensed, the operator releases the manual handle 302, which in turn causes the air pressure released by the step-down regulator 134 PR2 to be reduced to about 15 psi. This level of air pressure is insufficient to move the piston 50, which therefore stops in place.

b) Exhaust Mode

In the alternative preferred embodiment, there are two ways to cause the pneumatic control system 5 to enter the exhaust mode. The first exhaust mode is activated when the toggle switch 308 is moved into the exhaust position, as shown by line E in the control panel 300 in FIG. 7. The toggle switch 308 sends signal $B_1$ to the three-way valve 114, closing the three-way valve 114 V4 between the air source 200 and the dispensing assembly 10 DIS2 and opening the three-way valve 114 between the dispensing assembly 10 DIS2 and the venturi 108 VENT2. This allows the pressurized air in the dispensing assembly 10 to escape out to the atmosphere through the exhaust 126.

The second exhaust mode is activated by opening the door of the casing. When the door is opened, the door switch 400 is activated and in turn sends signal $B_1$ via line 86 to the three-way valve 114 V4, setting the valve 114 V4 in the same manner as described above for the toggle switch 308.

c) Retract Mode

When the operator wishes to retract the piston 50, the operator opens the door, activating the door switch 400 and placing the pneumatic control system 5 in the exhaust mode as described above. The operator then presses the spring-loaded toggle switch 308 up into the retract position, as indicated by line R on the control panel as shown in FIG. 7. Because of the spring loading, the operator must hold the toggle switch 308 in the retract position until the desired amount of retraction has been achieved. If the door switch 400 is not activated, moving the toggle switch 308 into the retract position R will not have any effect on the pneumatic control system 5.

When the toggle switch 308 is moved into the retract position R after the door switch 400 has been activated by the opening of the door, the toggle switch 308 sends a signal $C_2$ via line 86 to the two-way valve 106 V2. Signal $C_2$ opens the two-way valve 106 V2 between the air source 200 and the venturi 108 VENT2. As described above for the first preferred embodiment, the air flowing through the venturi 108 VENT2 generates a vacuum in the dispensing assembly 10 DIS2, and this vacuum causes the piston 50 to move toward the first end 24 of the receptacle 20 and away from the dispensing or second end 26.

When the piston 50 has been retracted to the position wanted, the operator releases the spring-loaded toggle switch 308, signaling the two-way valve 106 V2 to close. Because the door switch 400 is still activated at this time, the pneumatic dispensing system 5 returns to the exhaust mode. The amount of piston 50 retraction can be determined visually or by the sensor 80 as described above. Other methods of determining the amount of retraction will be evident to those skilled in the art, and the present invention is not meant to be limited by any particular description herein.

d) Operation of the Pneumatic Dispensing Control System 5

The operation of the various modes of the pneumatic dispensing control system 5 as described above for the alternative embodiment and in FIGS. 4–6 and 7 for dispenser DIS2 is set forth in the following Table II.

TABLE II

| Mode | Manual handle 302 | Switch 308 | Door switch 400 | Signals | Signal sent to: |
|---|---|---|---|---|---|
| Dispensing | Released or pulled | Dispensing position D | | $A_1$ (by switch 308) | Valve V4 |
| | | | | $A_2$ (by switch 308) | Valve V2 |
| | | | | $A_3$ (by handle 302) | Regulator PR2 |
| Exhaust 1 | Released | Exhaust position E | | $B_1$ | Valve V4 |
| | | | | $B_2$ | Valve V2 |
| Exhaust 2 | Released | Dispensing position D or exhaust position E | Activated | $B_1$ | Valve V4 |
| | | | | $B_2$ | Valve V2 |
| Retraction | Released | Retract position R | Activated | $C_1$ (by door switch 400) | Valve V4 |
| | | | | $C_2$ (by toggle switch 308) | Valve V2 |

It is to be expressly understood that the signals (i.e., A, B, and C) can be of any suitable electrical value required to open and close the valves of the present invention. For example, signal A could be high (i.e., +5 volts direct current) to open valve V4 and low (i.e., 0 volts direct current) to close valve V4.

The above disclosure sets forth a number of embodiments of the present invention. Those skilled in this art will however appreciate that other arrangements or embodiments, not precisely set forth, could be practiced under the teachings of the present invention and that the scope of this invention should only be limited by the scope of the following claims.

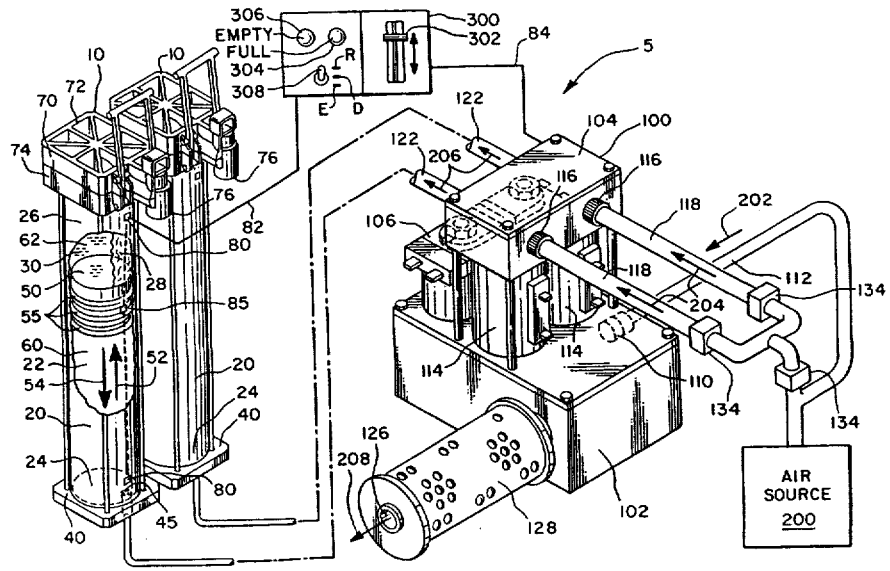

I claim:

1. A system for pneumatically dispensing a product, said system comprising:

a receptacle having a passageway therein for holding said product, said receptacle having a first end and a second end;

a free-floating piston within said passageway in said receptacle, said receptacle, piston, and first end defining a chamber;

means for delivering pressurized air into said chamber, said delivery means comprising a first valve between said pressurized air and said chamber whereby said pressurized air extends through said first valve and into said chamber when said first valve is open, said pressurized air causing said piston to move away from said first end and toward said second end, forcing said product out of said receptacle; and means for generating a vacuum in said chamber, said vacuum extending through said first valve when said first valve is open between said vacuum-generating means and said chamber, said vacuum causing said piston to move toward said first end and away from said second end.

2. The system of claim 1 wherein said vacuum-generating means comprises:

a venturi, said venturi in fluid communication with said chamber via said first valve; and a second valve between said venturi and said pressurized air.

3. The system of claim 2 wherein, to move said piston away from said first end and toward said second end, said pressurized air flows through said first valve into said chamber while said second valve remains closed.

4. The system of claim 2 wherein, to move said piston toward said first end and away from said second end, said pressurized air flows through said second valve and through said venturi, while said first valve remains closed between said pressurized air and said chamber but open between said venturi and said chamber, said pressurized air flowing through said venturi forming a vacuum in said chamber.

5. The system of claim 2 further comprising a casing into which said receptacle is placed, said casing having a door, said door having a switch that is activated by the opening of said door, the activation of said switch causing said pressurized air in said chamber to exit said chamber through said first valve and venturi.

6. The system of claim 1 further comprising at least one sensor to sense the position of said piston in said receptacle.

7. The system of claim 1 further comprising a container within said passageway between said piston and said second end, said container holding said product, said piston collapsing said container as said piston moves toward said second end.

8. A system for pneumatically dispensing a product, said system comprising:

a receptacle having a passageway therein for holding said product, said receptacle having a first end and a second end, a free-floating piston within said passageway in said receptacle, said receptacle, piston, and first end defining a chamber;

means for delivering pressurized air into said chamber, said delivery means comprising a first valve between said pressurized air and said chamber; and means for generating a vacuum in said chamber;

said system operating in three modes:

(a) a dispensing mode, wherein said pressurized air delivered into said chamber by said delivery means moves said piston away from said first end and toward said second end, forcing said product out of said receptacle;

(b) an exhaust mode, wherein said pressurized air in said chamber is removed from said chamber through said first valve, whereby said piston is caused to stop its movement; and (c) a retraction mode, wherein said vacuum generated in said chamber by said vacuum-generating means pulls said piston toward said first end and away from said second end.

9. The system of claim 8 wherein said vacuum-generating means comprises:

a venturi, said venturi in fluid communication with said chamber via said first valve; and a second valve between said venturi and said pressurized air.

10. The system of claim 9 wherein, when said system is in said dispensing mode, said pressurized air flows through said first valve into said chamber while said second valve remains closed.

11. The system of claim 9 wherein, when said system is in said exhaust mode, said pressurized air in said chamber flows through said first valve to said venturi while said second valve remains closed.

12. The system of claim 10, further comprising a casing into which said receptacle is placed, said casing having a door, said door having a switch, said switch activating said exhaust mode when said door is opened.

13. The system of claim 9 wherein, when said system is in said retraction mode, said pressurized air flows through said second valve and through said venturi, while said first valve remains closed between said pressurized air and said chamber but open between said venturi and said chamber, said pressurized air flowing through said venturi forming a vacuum in said chamber.

14. A system for pneumatically dispensing a product, said system comprising:

a receptacle having a passageway therein for holding said product, said receptacle having a first end and a second end;

a free-floating piston within said passageway in said receptacle between said first end and said second end, said receptacle, piston, and first end defining a chamber within said receptacle;

a pressurized air supply in fluid communication with said chamber;

a first valve between said pressurized air supply and said chamber;

a venturi attached to said first valve; and a second valve between said pressurized air supply and said venturi;

said pressurized air from said pressurized air supply flowing through said first valve and entering said chamber, moving said piston away from said first end and toward said second end, forcing said product out of said receptacle, when said first valve allows communication between said pressurized air supply and said chamber and not between said venturi and said chamber, and said second valve is closed;

said venturi generating a vacuum in said chamber, moving said piston toward said first end and away from said second end, when said first valve allows communication between said chamber and said venturi and not between said pressurized air supply and said chamber, and said second valve allows said pressurized air to flow through said venturi.

15. The system of claim 14 wherein said pressurized air supply is about 100 psi.

16. The system of claim 15 further comprising a pressure regulator for reducing the pressure of said pressurized air to a range of about 15 psi to about 60 psi before said pressurized air is introduced into said chamber.

17. The system of claim 14 wherein said first valve is a three-way valve.

18. The system of claim 14 wherein said pressurized air in said chamber is exhausted from said chamber when said first valve allows communication between said chamber and said venturi and not between said pressurized air supply and said chamber, and said second valve is closed.

19. The system of claim 18 further comprising a casing into which said receptacle is placed, said casing having a door, said door having a switch, said switch activating said exhaust mode when said door is opened.

20. The system of claim 14 further comprising at least one sensor to sense the position of said piston in said receptacle.

21. The system of claim 14 further comprising a collapsible container within said passageway between said piston and said second end, said container holding said product, said piston collapsing said container as said piston moves toward said second end.

22. A system for pneumatically dispensing a frozen food product, said system comprising:

a receptacle having a passageway therein for holding said frozen product, said receptacle having a first end and a second end;

a free-floating piston within said passageway in said receptacle between said first end and said second end, said receptacle, piston, and first end defining a chamber within said receptacle;

a pressurized air supply in fluid communication with said chamber;

a three-way valve between said pressurized air supply and said chamber;

a venturi attached to said three-way valve and in fluid communication with said chamber, said venturi also being attached to an exhaust port; and a two-way valve between said pressurized air supply and said venturi;

said system operating in one of three modes:

(a) a dispensing mode, wherein pressurized air from said pressurized air supply flows through said three-way valve and enters said chamber when said three-way valve is opened between said pressurized air supply and said chamber and is closed between said venturi and said chamber, and said two-way valve is closed between said venturi and said pressurized air supply, said pressurized air moving said piston away from said first end and toward said second end, forcing said frozen product out of said receptacle;

(b) an exhaust mode, wherein said pressurized air in said chamber is exhausted from said chamber when said three-way valve is opened between said chamber and said venturi and is closed between said pressurized air supply and said chamber and said two-way valve is closed between said venturi and said pressurized air supply, said pressurized air exiting said system through said exhaust port; and (c) a retraction mode, wherein said three-way valve is opened between said chamber and said venturi and is closed between said pressurized air source and said chamber and said two-way valve is opened between said pressurized air source and said venturi, said pressurized air flowing through said venturi forming a vacuum in said chamber, said vacuum moving said piston toward said first end and away from said second end.

23. The system of claim 22, further comprising a casing into which said receptacle is placed, said casing having a door, said door having a switch, said switch activating said exhaust mode when said door is opened.

24. The system of claim 22 further comprising a pressure regulator between said pressurized air source and said chamber, said pressure regulator providing pressurized air at between about 15 psi and about 60 psi to said chamber in said dispensing mode.

25. A method for pneumatically dispensing a product, said method comprising the steps of:

providing a receptacle having a passageway therein to hold said product, said receptacle having a first end and a second end;

placing within said passageway in said receptacle a free-floating piston, said receptacle, said first end, and said piston defining a chamber;

delivering pressurized air into said chamber through a first valve between said pressurized air and said chamber, said pressurized air causing said piston to move away from said first end and toward said second end, said moving piston forcing said product out of said receptacle; and generating a vacuum in said chamber, said vacuum extending through said first valve causing said piston to move toward said first end and away from said second end.

26. The method of claim 25 wherein said vacuum is generated by sending said pressurized air through a venturi in fluid communication with said chamber.

27. The method of claim 26 further comprising the steps of:

placing said receptacle into a casing having a door, said door having a switch; and opening said door and thereby activating said switch, the activation of said switch evacuating said pressurized air in said chamber through said venturi.

28. The method of claim 25 wherein said pressurized air has a pressure of about 100 psi.

29. The method of claim 28 further comprising the step of reducing the pressure of said pressurized air to a range of about 15 psi to about 60 psi before said pressurized air is introduced into said chamber.

30. The method of claim 25 further comprising the step of sensing the position of said piston in said receptacle.

31. The method of claim 25 further comprising the step of inserting a container within said passageway between said piston and said second end, said container holding said product; and collapsing said container with said piston as said piston moves toward said second end.

32. A system for pneumatically dispensing a product, said system comprising:

a receptacle having a passageway therein for holding said product, said receptacle having a first end and a second end;

a free-floating piston within said passageway in said receptacle, said receptacle, piston, and first end defining a chamber;

means for delivering pressurized air into said chamber, said pressurized air causing said piston to move away from said first end and toward said second end, forcing said product out of said receptacle;

means for generating a vacuum in said chamber, said vacuum causing said piston to move toward said first end and away from said second end;

a first valve between said pressurized air and said chamber;

a venturi in fluid communication with said chamber via said first valve; and a second valve between said venturi and said pressurized air.

33. A system for pneumatically dispensing a product, said system comprising:

a receptacle having a passageway therein for holding said product, said receptacle having a first end and a second end;

a free-floating piston within said passageway in said receptacle, said receptacle, piston, and first end defining a chamber;

means for delivering pressurized air into said chamber, said pressurized air causing said piston to move away from said first end and toward said second end, forcing said product out of said receptacle;

means for generating a vacuum in said chamber, said vacuum causing said piston to move toward said first end and away from said second end;

a first valve between said pressurized air and said chamber;

a venturi in fluid communication with said chamber via said first valve; and a second valve between said venturi and said pressurized air;

wherein, to move said piston away from said first end and toward said second end, said pressurized air flows through said first valve into said chamber while said second valve remains closed.

34. A system for pneumatically dispensing a product, said system comprising:

a receptacle having a passageway therein for holding said product, said receptacle having a first end and a second end;

a free-floating piston within said passageway in said receptacle, said receptacle, piston, and first end defining a chamber;

means for delivering pressurized air into said chamber, said pressurized air causing said piston to move away from said first end and toward said second end, forcing said product out of said receptacle;

means for generating a vacuum in said chamber, said vacuum causing said piston to move toward said first end and away from said second end;

a first valve between said pressurized air and said chamber;

a venturi in fluid communication with said chamber via said first valve;

a second valve between said venturi and said pressurized air;

wherein, to move said piston away from said first end and toward said second end, said pressurized air flows through said first valve into said chamber while said second valve remains closed, and, to move said piston toward said first end and away from said second end, said pressurized air flows through said second valve and through said venturi, while said first valve remains closed between said pressurized air and said chamber but open between said venturi and said chamber, said pressurized air flowing through said venturi forming a vacuum in said chamber.

35. A system for pneumatically dispensing a product, said system comprising:

a receptacle having a passageway therein for holding said product, said receptacle having a first end and a second end;

a free-floating piston within said passageway in said receptacle, said receptacle, piston, and first end defining a chamber;

means for delivering pressurized air into said chamber, said pressurized air causing said piston to move away from said first end and toward said second end, forcing said product out of said receptacle;

means for generating a vacuum in said chamber, said vacuum causing said piston to move toward said first end and away from said second end;

a first valve between said pressurized air and said chamber;

a venturi in fluid communication with said chamber via said first valve;

a second valve between said venturi and said pressurized air, wherein, to move said piston away from said first end and toward said second end, said pressurized air flows through said first valve into said chamber while said second valve remains closed, and, to move said piston toward said first end and away from said second end, said pressurized air flows through said second valve and through said venturi while said first valve remains closed between said pressurized air and said chamber but open between said venturi and said chamber, said pressurized air flowing through said venturi forming a vacuum in said chamber; and a casing into which said receptacle is placed, said casing having a door, said door having a switch that is activated by the opening of said door, the activation of said switch causing said pressurized air in said chamber to exit said chamber through said first valve and venturi.

36. A system for pneumatically dispensing a product, said system comprising:

a receptacle having a passageway therein for holding said product, said receptacle having a first end and a second end;

a free-floating piston within said passageway in said receptacle, said receptacle, piston, and first end defining a chamber;

means for delivering pressurized air into said chamber;

means for generating a vacuum in said chamber;

a first valve between said pressurized air and said chamber;

a venturi in fluid communication with said chamber via said first valve; and a second valve between said venturi and said pressurized air;

said system operating in three modes:
(a) a dispensing mode, wherein said pressurized air delivered into said chamber by said delivery means moves said piston away from said first end and toward said second end, forcing said product out of said receptacle;
(b) an exhaust mode, wherein said pressurized air in said chamber is removed from said chamber; and
(c) a retraction mode, wherein said vacuum generated in said chamber by said vacuum-generating means pulls said piston toward said first end and away from said second end.

37. A system for pneumatically dispensing a product, said system comprising:

a receptacle having a passageway therein for holding said product, said receptacle having a first end and a second end;

a free-floating piston within said passageway in said receptacle, said receptacle, piston, and first end defining a chamber;

means for delivering pressurized air into said chamber;

means for generating a vacuum in said chamber;

a first valve between said pressurized air and said chamber;

a venturi in fluid communication with said chamber via said first valve; and a second valve between said venturi and said pressurized air;

said system operating in three modes:
  (a) a dispensing mode, wherein said pressurized air delivered into said chamber by said delivery means moves said piston away from said first end and toward said second end, forcing said product out of said receptacle;
  (b) an exhaust mode, wherein said pressurized air in said chamber is removed from said chamber; and
  (c) a retraction mode, wherein said vacuum generated in said chamber by said vacuum-generating means pulls said piston toward said first end and away from said second end;

wherein, when said system is in said dispensing mode, said pressurized air flows through said first valve into said chamber while said second valve remains closed.

38. A system for pneumatically dispensing a product, said system comprising:

a receptacle having a passageway therein for holding said product, said receptacle having a first end and a second end;

a free-floating piston within said passageway in said receptacle, said receptacle, piston, and first end defining a chamber;

means for delivering pressurized air into said chamber;

means for generating a vacuum in said chamber;

a first valve between said pressurized air and said chamber;

a venturi in fluid communication with said chamber via said first valve; and a second valve between said venturi and said pressurized air;

said system operating in three modes:
  (a) a dispensing mode, wherein said pressurized air delivered into said chamber by said delivery means moves said piston away from said first end and toward said second end, forcing said product out of said receptacle;
  (b) an exhaust mode, wherein said pressurized air in said chamber is removed from said chamber; and
  (c) a retraction mode, wherein said vacuum generated in said chamber by said vacuum-generating means pulls said piston toward said first end and away from said second end;

wherein, when said system is in said dispensing mode, said pressurized air flows through said first valve into said chamber while said second valve remains closed; and wherein, when said system is in said exhaust mode, said pressurized air in said chamber flows through said first valve to said venturi while said second valve remains closed.

39. A system for pneumatically dispensing a product, said system comprising:

a receptacle having a passageway therein for holding said product, said receptacle having a first end and a second end;

a free-floating piston within said passageway in said receptacle, said receptacle, piston, and first end defining a chamber;

means for delivering pressurized air into said chamber;

means for generating a vacuum in said chamber;

a first valve between said pressurized air and said chamber;

a venturi in fluid communication with said chamber via said first valve;

a second valve between said venturi and said pressurized air; and a casing into which said receptacle is placed, said casing having a door, said door having a switch, said switch activating said exhaust mode when said door is opened;

said system operating in three modes:
  (a) a dispensing mode, wherein said pressurized air delivered into said chamber by said delivery means moves said piston away from said first end and toward said second end, forcing said product out of said receptacle;
  (b) an exhaust mode, wherein said pressurized air in said chamber is removed from said chamber; and
  (c) a retraction mode, wherein said vacuum generated in said chamber by said vacuum-generating means pulls said piston toward said first end and away from said second end;

wherein, when said system is in said dispensing mode, said pressurized air flows through said first valve into said chamber while said second valve remains closed;

wherein, when said system is in said exhaust mode, said pressurized air in said chamber flows through said first valve to said venturi while said second valve remains closed.

40. A system for pneumatically dispensing a product, said system comprising:

a receptacle having a passageway therein for holding said product, said receptacle having a first end and a second end;

a free-floating piston within said passageway in said receptacle, said receptacle, piston, and first end defining a chamber;

means for delivering pressurized air into said chamber;

means for generating a vacuum in said chamber; a first valve between said pressurized air and said chamber;

a venturi in fluid communication with said chamber via said first valve;

a second valve between said venturi and said pressurized air; and a casing into which said receptacle is placed, said casing having a door, said door having a switch, said switch activating said exhaust mode when said door is opened;

said system operating in three modes:
  (a) a dispensing mode, wherein said pressurized air delivered into said chamber by said delivery means moves said piston away from said first end and toward said second end, forcing said product out of said receptacle;
  (b) an exhaust mode, wherein said pressurized air in said chamber is removed from said chamber; and
  (c) a retraction mode, wherein said vacuum generated in said chamber by said vacuum-generating means pulls said piston toward said first end and away from said second end;

wherein, when said system is in said dispensing mode, said pressurized air flows through said first valve into said chamber while said second valve remains closed;

wherein, when said system is in said exhaust mode, said pressurized air in said chamber flows through said first valve to said venturi while said second valve remains closed; and wherein, when said system is in said retraction mode, said pressurized air flows through said second valve and through said venturi, while said first valve remains closed between said pressurized air and said chamber but open between said venturi and said chamber, said pressurized air flowing through said venturi forming a vacuum in said chamber.

41. A method for pneumatically dispensing a product, said method comprising the steps of providing a receptacle having a passageway therein for holding said product, said receptacle having a first end and a second end;

placing within said passageway in said receptacle a free-floating piston, said receptacle, said first end, and said piston defining a chamber;

delivering pressurized air into said chamber, said pressurized air causing said piston to move away from said first end and toward said second end, said moving piston forcing said product out of said receptacle; and generating a vacuum in said chamber by sending said pressurized air through a venturi in fluid communication with said chamber, said vacuum causing said piston to move toward said first end and away from said second end.

42. A method for pneumatically dispensing a product, said method comprising the steps of:

providing a receptacle having a passageway therein for holding said product, said receptacle having a first end and a second end;

placing within said passageway in said receptacle a free-floating piston, said receptacle, said first end, and said piston defining a chamber;

delivering pressurized air into said chamber, said pressurized air causing said piston to move away from said first end and toward said second end, said moving piston forcing said product out of said receptacle; and generating a vacuum in said chamber by sending said pressurized air through a venturi in fluid communication with said chamber, said vacuum causing said piston to move toward said first end and away from said second end;

placing said receptacle in a casing having a door, said door having a switch; and opening said door and thereby activating said switch, the activation of said switch evacuating said pressurized air in said chamber through said venturi.

* * * * *

UNITED STATES PATENT AND TRADEMARK OFFICE
CERTIFICATE OF CORRECTION

PATENT : 5,779,098
DATED : July 14, 1998
INVENTOR(S) : Hershel Edward Fancher

It is certified that error appears in the above-identified patent and that said Letters Patent is hereby corrected as shown below:

The title page, showing the illustrative figure, should be deleted, and substitute therefor the attached title page.

In the Drawings:

Delete FIG. 1 and replace with attached FIG. 1;
Delete FIG. 6 and replace with attached FIG. 6; and
Delete FIG. 7 and replace with attached FIG. 7.

Signed and Sealed this

Seventeenth Day of November, 1998

Attest:

BRUCE LEHMAN

*Attesting Officer*    *Commissioner of Patents and Trademarks*

United States Patent [19]
Fancher

[11] Patent Number: 5,779,098
[45] Date of Patent: Jul. 14, 1998

[54] PRESSURE CONTROL SYSTEM FOR FREE-FLOATING PISTON

[75] Inventor: Hershel Edward Fancher, New Albany, Ind.

[73] Assignee: Grand Soft Equipment Company, Louisville, Ky.

[21] Appl. No.: 701,631

[22] Filed: Aug. 22, 1996

[51] Int. Cl.⁶ .................................................. B67D 5/22
[52] U.S. Cl. .......................... 222/41; 222/334; 222/389
[58] Field of Search ................................. 222/152, 399, 222/389, 135, 105, 95, 23, 183, 327, 249, 334, 146.6, 444, 41; 92/134

[56] References Cited

U.S. PATENT DOCUMENTS

| | | | |
|---|---|---|---|
| 3,327,906 | 6/1967 | Görnann | 222/389 |
| 4,886,189 | 12/1989 | Vanderjagt | 222/49 |
| 5,048,724 | 9/1991 | Thomas | 222/95 |
| 5,114,054 | 5/1992 | Watson | 222/389 |
| 5,150,820 | 9/1992 | Mcgill | 222/389 |
| 5,259,842 | 11/1993 | Plechinger et al. | 222/389 |
| 5,265,764 | 11/1993 | Rowe et al. | 222/95 |
| 5,405,054 | 4/1995 | Thomas | 222/95 |
| 5,452,824 | 9/1995 | Danek et al. | 222/389 |
| 5,492,249 | 2/1996 | Beach | 222/96 |

*Primary Examiner*—Philippe Derakshani
*Attorney, Agent, or Firm*—Dorr, Carson, Sloan & Birney, P.C.

[57] ABSTRACT

An apparatus and method are disclosed to force a frozen food product out of a receptacle by moving a piston back and forth within the receptacle. Pressurized air is used to move the piston toward the frozen product, thereby forcing the frozen product out of the receptacle. To move the piston away from the frozen product, the pressurized air is sent through a venturi that also connects to the receptacle. The flow of pressurized air through the venturi creates a vacuum in the receptacle. The vacuum pulls the piston away from the frozen product.

42 Claims, 6 Drawing Sheets